Patented Apr. 16, 1940

2,197,421

UNITED STATES PATENT OFFICE 2,197,421

POLYVINYL ACETAL RESIN COMPOSITION CONTAINING TETRAHYDROFURFURYL TETRAHYDROFUROATE

Henry B. Smith and Donald R. Swan, Rochester, N. Y., assignors to Eastman Kodak Company, Rochester, N. Y., a corporation of New Jersey No Drawing. Application October 7, 1938,
Serial No. 233,883

9 Claims. (Cl. 260—36)

This invention relates to plastic compositions, and more particularly to compositions comprising a polyvinyl acetal resin and a conditioning agent.

One object of this invention is to produce compositions of matter which may be made into permanently transparent, strong, and flexible sheets or films of desired thinness which are substantially waterproof, are unaffected by ordinary photographic fluids and possess the desired properties of a support for sensitive photographic coatings. Another object of our invention is to produce compositions of matter which can be made into sheets suitable for use in laminated, shatter-proof glass. Still another object is to produce compositions which can be rolled, extruded, molded or otherwise worked into relatively thick sheets and massive plastics. A further object is to produce compositions suitable for use in lacquers, artificial silk filaments, wrapping tissues and the like. Other objects will hereinafter appear.

We have discovered that tetrahydrofurfuryl tetrahydrofuroate is a very useful conditioning agent for polyvinyl acetal resins. Not only does it serve as a plasticizer in the accepted sense of the term, increasing the flexibility and toughness of polyvinyl acetal resin films, sheets, or other objects or masses containing it, but when used in amounts of about 75 or more parts per 100 or more parts of certain of the polyvinyl acetal resins, namely the polyvinyl acetal resins in which a predominating proportion of the acetal groups are formaldehyde acetal groups, it has an unusual and remarkable effect which we may call "elasticizing." That is to say, a sheet of a polyvinyl formaldehyde acetal resin containing about 75 or more parts of tetrahydrofurfuryl tetrahydrofuroate per 100 parts of resin possesses the property which, in the rubber industry, is known as "nerve:" namely, the property of stretching to a considerable extent when tension is exerted upon it, and returning to its original dimensions when the tension is released. This property renders such sheets, which we shall call "rubbery" sheets, particularly useful in the manufacture of shatter-proof glass.

For the manufacture of cast films or sheets, the polyvinyl acetal resin and tetrahydrofurfuryl tetrahydrofuroate may be dissolved in a suitable solvent or solvent mixture, such, for instance, as acetone, methanol, acetone-methanol mixtures, ethylene chloride-methanol mixtures, etc., about 300 to 500 or more parts of the solvent or solvent mixture being used per 100 parts of the resin. From about 2 to 100 parts or more of tetrahydrofurfuryl tetrahydrofuroate per 100 parts of resin may be employed, depending upon the nature of the resin and the purpose for which the sheets are to be used. Suitable proportions of tetrahydrofurfuryl tetrahydrofuroate for any resin and any purpose may be readily determined by experiment. For the manufacture of sheets suitable for photographic film base, from 2 to 25 parts of tetrahydrofurfuryl tetrahydrofuroate per 100 parts of resin are suitable. The resin solution is cast as a sheet, the solvent evaporated, and the film stripped from the casting surface.

Sheets for use in laminated glass may be formed by casting, or may be made without the use of volatile solvent by extrusion, for example in the manner set forth in application Serial No. 147,934 of John S. Kimble and Ernest C. Blackard, filed June 12, 1937. For instance, 75 or more parts of tetrahydrofurfuryl tetrahydrofuroate and 100 parts of polyvinyl formaldehyde acetal resin may be mixed in a suitable, jacketed mixer at a low temperature, for example 10° C., and the mixture may then be worked on hot rolls, in the manner described in U. S. Patent 2,048,686 of F. R. Conklin, until complete homogenization has taken place. The mass thus produced may then be extruded through an annular die, and the tube so formed slit to form a sheet.

The polyvinyl acetal resins can be prepared by reacting polyvinyl alcohol with an aldehyde in the presence of an acetal condensation catalyst, e. g. a mineral acid. These resins can also be prepared by simultaneously de-esterifying a polyvinyl aliphatic ester and reacting the de-esterification product with an aldehyde in the presence of a de-esterifying catalyst and acetal condensation catalyst. Mineral acids are catalysts for both deesterification and acetal formation. Among the polyvinyl acetal resins with which tetrahydrofurfuryl tetrahydrofuroate is useful may be mentioned, as illustrative examples, the polyvinyl formaldehyde acetal resins, the polyvinyl acetaldehyde acetal resins, the polyvinyl formaldehyde acetaldehyde mixed acetal resins, the polyvinyl butyraldehyde acetal resins, and the polyvinyl butyraldehyde acetaldehyde mixed acetal resins.

Examples of the preparation of polyvinyl formaldehyde acetal resins may be found in U. S. Patent 1,955,068, Examples 1, 4 and 5; in U. S. Patent 2,036,092, Examples 1, 2, 3, 7 and 8; in British Patent 454,691, Examples 1, 2, 3, 4, 5, 6 and 7; in British Patent 404,279, Example 3; and in British Patent 436,072, Examples 1, 2, 3, 4, 5, 6 and 7. Further examples of the preparation of polyvinyl formaldehyde acetal resins are as follows:

25 lbs. of polyvinyl acetate, the viscosity of whose "molar" solution (86.08 g. per liter) in benzene was 45 centipoises, was dissolved in 75 lbs. of 70% acetic acid. To this solution were added 56 grams of hydroxylamine hydrochloride, for stabilizing the resin, 5.25 lbs. of trioxymethylene, and 6.25 lbs. of 35% HCl. The reaction mixture was allowed to stand for 5 days at 40° C., after which it was diluted with acetic acid. The resin was precipitated by pouring into cold water, washed, and dried. Analysis showed the resin to have an acetate group content equivalent to 10.6% by weight of polyvinyl acetate and a hydroxyl group content equivalent to 7.1% by weight of polyvinyl alcohol. The stabilization of polyvinyl acetal resins by hydroxylamine is claimed in the application of Joseph B. Hale, Serial No. 149,916, filed June 23, 1937, Patent No. 2,146,735.

70 lbs. of polyvinyl acetate, the viscosity of whose molar solution in benzene was 45 centipoises, was dissolved in a mixture of 336 lbs. of glacial acetic acid and 224 lbs. of water. After solution was effected, there were added a solution of 318 grams of sodium nitrite in 500 cc. of water, for stabilizing the resin, 15.2 lbs. of trioxymethylene and 17.5 lbs. of 35% HCl. The reaction mixture was allowed to stand for 5 days at 40° C., whereupon 5 lbs. additional 35% HCl was added and the reaction continued for 6 days longer: a total of 11 days at 40° C. The reaction mixture was then diluted with a mixture of acetic acid and ethyl alcohol, and the resin was precipitated by pouring into cold water, washed, and dried. Analysis showed the resin to have an acetate group content equivalent to 10.7% by weight of polyvinyl acetate and a hydroxyl group content equivalent to 11.2% by weight of polyvinyl alcohol. The stabilization of polyvinyl acetal resins by nitrous acid is claimed in the application of Charles R. Fordyce and Martti Salo, Serial No. 159,193, filed August 14, 1937, Patent No. 2,159,263.

Examples of the preparation of polyvinyl acetaldehyde acetal resins may be found in U. S. Patent 2,044,730, Example 1; U. S. Patent 1,955,068, Example 2; U. S. Patent 2,036,092, Examples 4, 5 and 6; British Patent 466,598, Examples 1, 2, 3, 4 and 7; British Patent 404,279, Examples 1, 2, 4, 5, 6, 7 and 8; U. S. Patent 1,990,399; and French Patent 808,578, Examples 1, 2 and 3.

An additional example of the preparation of a polyvinyl acetaldehyde acetal resin is as follows:

50 lbs. of polyvinyl acetate, the viscosity of whose molar solution in benzene was 45 centipoises, was dissolved in a mixture composed of 50 lbs. of 95% ethyl alcohol and 90 lbs. of ethyl acetate. To this solution was added 19.2 lbs. of paraldehyde. Then a catalyst consisting of 5 lbs. of 95% sulfuric acid diluted with 5 lbs. of water was added. After thorough mixing, the reaction was allowed to proceed at 40° C. for 8 days. The reaction mixture was then diluted with acetone, and the resin precipitated by pouring into cold water, washed and dried. Analysis showed the resin to have an acetate group content equivalent to 3.3% of polyvinyl acetate and a hydroxyl group content equivalent to 6.5% of polyvinyl alcohol.

Examples of the preparation of polyvinyl formaldehyde acetaldehyde mixed acetal resins may be found in British Patent 430,136, Examples 1, 2, 3, 4, 5 and 6; British Patent 445,565, Example 2; British Patent 465,873, Examples 1, 2, 3, 4, 5 and 6; French Patent 808,586, Examples 1, 2, 3, 4, 5, 6, 12, 13, 14, 15, 16, 17, 18 and 19.

Additional examples of the preparation of polyvinyl formaldehyde acetaldehyde mixed acetal resins are given in the application of Ralph H. Talbot, Serial No. 85,960, filed June 18, 1936, as follows:

"*Example 1*

"100 parts (1.16 mol. calculated as monomeric vinyl acetate) of a polyvinyl acetate (45 centipoises), 100 parts of ethyl alcohol, 180 parts of ethyl acetate, 34 parts (.77 mol. as monomeric acetaldehyde) of paracetaldehyde and 5.8 parts (.196 mol. as monomeric formaldehyde) of paraformaldehyde were placed in an enamelled vessel and brought into solution by stirring. When solution was complete, 10 parts of sulfuric acid (sp. g. 1.84) in 10 parts of water were added, and the mixture stirred. The mixture was maintained at a temperature of 40° C. for 144 hours. The contents of the vessel were then diluted with about two and a half volumes of acetone, and the mixture precipitated into water. The precipitated resin was washed free from impurities by repeated changes of cold water, and dried. The resin, when analyzed, gave a hydroxyl group content equivalent to about 6.4 per cent by weight of polyvinyl alcohol, an acetate group content equivalent to about 4.0 per cent by weight of polyvinyl acetate, a formaldehyde acetal group content equivalent to about 15.9 per cent by weight of polyvinyl formaldehyde acetal and an acetaldehyde acetal group content equivalent to about 73.9 per cent by weight of polyvinyl acetaldehyde acetal. The polyvinyl acetal portion of the resin was therefore made up of about 19.7 per cent by moles of polyvinyl formaldehyde acetal and about 80.3 per cent by moles of polyvinyl acetaldehyde acetal. The resin was soluble in acetone to an extent which permitted coating a film or sheet from the resin.

"*Example 2*

"50 parts (.58 mol. as monomer) of polyvinyl acetate (45 centipoises), 50 parts of ethyl alcohol, 90 parts of ethyl acetate, 17 parts (.385 mol. as monomer) of paracetaldehyde, 2.9 parts (.098 mol. as monomer) of paraformaldehyde, 5 parts of sulfuric acid and 5 parts of water were treated as in Example 1 for 161 hours. The well washed and dried resin gave upon anlysis a hydroxyl group content equivalent to about 9.6% by weight of polyvinyl alcohol, an acetate group content equivalent to about 4.1% by weight of polyvinyl acetate, a formaldehyde acetal group content equivalent to about 13.9 per cent by weight of polyvinyl formaldehyde acetal, and an acetaldehyde acetal group content equivalent to about 69.9 per cent of polyvinyl acetaldehyde acetal. The polyvinyl acetal portion of the resin was therefore made up of about 18.5 per cent by moles of polyvinyl formaldehyde acetal and 81.5 per cent by moles of polyvinyl acetaldehyde acetal. The resin was soluble in acetone to an extent which permitted coating a film or sheet from the resin.

"*Example 3*

"1300 parts (15.1 mol. as monomer) of a polyvinyl acetate (45 centipoises), 1700 parts of ethyl acetate, 2250 parts of ethyl alcohol (95%) and 48 parts (1.57 mol. as monomer) of paraformaldehyde (trioxymethylene) were placed in a vessel equipped with a reflux condenser and a means of agitation, and the contents brought to a temperature of about 70° C. by means of steam heating. 182.25 parts of sulfuric acid (sp. g. 1.84) dissolved in 51.5 parts of water were added, and the whole was heated at about 70° C. for about five hours, agitating throughout. At this point, 266.4 parts (6.05 mol. as monomer) of paracetaldehyde were added and heating at about 70° C. with agitation was continued for a further period of twenty hours. The contents of the reaction vessel were neutralized with ammonium hydroxide and diluted with water precipitating the resin as a cake. The cake was cut into small pieces and repeatedly washed with hot water until the resin was free from solvents, salts and other impurities. The resin, upon analysis, showed a hydroxyl group content equivalent to about 10.1 per cent by weight of polyvinyl alcohol, an acetate group content equivalent to about 3.2 per cent by weight of polyvinyl acetate, the remainder of the weight of the resin being polyvinyl acetal. The polyvinyl acetal portion of the resin was made up of about 80 percent by moles of polyvinyl acetaldehyde acetal and about 20 percent by moles of polyvinyl formaldehyde acetal. The resin was not quite soluble in acetone, but could be made to dissolve by admixing small amounts of other solvents, such as alcohols, with the acetone."

Examples of the preparation of polyvinyl butyraldehyde acetal resins may be found in U. S. Patent 2,044,730, Examples 2, 5 and 6; British Patent 466,598, Example 5; French Patent 813,303, Example 1; French Patent 813,514, Examples 1, 2, 3, and 4; and British Patent 459,878, Examples 1, 2, 5, 6, 7, 8, 9 and 10.

An additional example of the preparation of a polyvinyl butyraldehyde acetal resin is as follows:

20 lbs. of polyvinyl acetate, the viscosity of whose molar solution in benzene was 45 centipoises, was dissolved in 20 lbs. of 95% ethyl alcohol and 36 lbs. of ethyl acetate. To this solution was added 13 lbs. of butyraldehyde and a solution of 2 lbs. of sulfuric acid in 2 lbs of water. The reaction mixture was allowed to stand for 8 days at 40° C., after which it was diluted with acetone, and the resin precipitated by pouring into cold water, washed and dried. Analysis showed the resin to have an acetate group content equivalent to 7.8% by weight of polyvinyl acetate and a hydroxyl group content equivalent to 4.8% by weight of polyvinyl alcohol.

An example of the preparation of a polyvinyl butyraldehyde acetaldehyde mixed acetal resin is given in French Patent 813,303, Example 2.

What we claim as our invention and desire to be secured by Letters Patent of the United States is:

1. A composition of matter comprising a polyvinyl acetal resin and tetrahydrofurfuryl tetrahydrofuroate as a plasticizer therefor.

2. A transparent, flexible sheet comprising 100 parts of a polyvinyl acetal resin and from 2 to 25 parts, approximately, of tetrahydrofurfuryl tertahydrofuroate as a plasticizer therefor.

3. A transparent, rubbery sheet comprising 100 parts of a polyvinyl acetal resin in which a predominating proportion of the acetal groups are formaldehyde acetal groups, and at least 75 parts, approximately, of tetrahydrofurfuryl tetrahydrofuroate as an elasticizer therefor.

4. A composition of matter comprising a polyvinyl acetaldehyde acetal resin and tetrahydrofurfuryl tetrahydrofuroate as a plasticizer therefor.

5. A transparent, flexible sheet comprising 100 parts of a polyvinyl acetaldehyde acetal resin and from 2 to 25 parts, approximately, of tetrahydrofurfuryl tetrahydrofuroate as a plasticizer therefor.

6. A composition of matter comprising a polyvinyl formaldehyde acetal resin and tetrahydrofurfuryl tetrahydrofuroate as a plasticizer therefor.

7. A transparent, rubbery sheet comprising 100 parts of a polyvinyl formaldehyde acetal resin and at least 75 parts, approximately, of tetrahyddrofurfuryl tetrahydrofuroate as an elesticizer therefor.

8. A composition of matter comprising a polyvinyl butyraldehyde acetal resin and tetrahydrofurfuryl tetrahydrofuroate as a plasticizer therefor.

9. A transparent, flexible sheet comprising 100 parts of a poylvinyl butyraldehyde acetal resin and from 2 to 25 parts approximately, of tetrahydrofurfuryl tetrahydrofuroate as a plasticizer therefor.

HENRY B. SMITH.
DONALD R. SWAN.